Patented Sept. 16, 1947

2,427,497

UNITED STATES PATENT OFFICE 2,427,497

PROCESS FOR THE ISOMERIZATION OF ALLO-OCIMENE

Leo A. Goldblatt, New Orleans, La., assignor to United States of America, as represented by the Secretary of Agriculture No Drawing. Application March 23, 1945, Serial No. 584,485

4 Claims. (Cl. 260—675.5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to terpenes and is more particularly concerned with the treatment of allo-ocimene for the purpose of producing other terpenes.

Allo-ocimene, also known as 2,6-dimethyl-2,4,6-octatriene, is an acyclic terpene hydrocarbon having the structural formula:

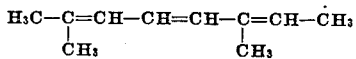

Allo-ocimene may be obtained in good yield by the non-catalytic vapor phase thermal isomerization of the bicyclic terpene α-pinene in accordance with the procedure disclosed in copending application Serial No. 352,112, filed August 10, 1940.

Both isomers and polymers of allo-ocimene may be obtained simultaneously by heating allo-ocimene in the liquid state at a temperature in the range of about 100° to 200° C., as during purification by fractional distillation. Either atmospheric or sub-atmospheric pressures may be employed as desired. The amount and proportion of the isomers and polymers that will be produced depend upon the temperature and period of heating. For example, by fractionally distilling allo-ocimene slowly at a pressure of 20 mm. (still pot temperature 110° C.) over a period of 200 hours, polymeric and isomeric terpenes are formed in the ratio of about 7½ to 1, respectively. The isomers formed are chiefly monocyclic terpenes, boiling in the range of 48° to 72° C. at a pressure of 20 mm., and consist mainly of α- and β-pyronene. The polymer is chiefly the dimer of allo-ocimene ($C_{20}H_{32}$), having a boiling point of approximately 180° C. at 8 mm. pressure.

By increasing the temperature and decreasing the period of heating, there is effected an increase in isomerization and a decrease in polymerization. For example, at 400° C., the product obtained is substantially all isomeric monocyclic terpenes and only negligible quantities of the polymer are formed.

The extent of isomerization can be followed during the reaction by observing changes in refractive index or density, or both. Since allo-ocimene at 20° C. has a refractive index of 1.544 and a density of 0.808 gram per cc. and since the isomers have an average refractive index of about 1.475 and a density of about 0.838, while the polymer under the same conditions has a refractive index of 1.523 and a density of 0.886 gram per cc., a maximum lowering of refractive index accompanied by a minimum increase in density will indicate the maximum proportion of isomerization and the minimum proportion of polymerization.

The extent of polymerization depends upon the temperature and time of contact. The required time of contact decreases as the temperature increases. At temperatures below about 300° C., the isomerization is very slow and is accompanied by the simultaneous formation of excess polymer. At temperatures above about 500° C., considerable decomposition occurs which is accompanied by the formation of non-condensable gas. The preferred temperature range for the isomerization is about 300° C. to 500° C. with a time of contact of about 60 to 0.1 seconds.

Maximum conversion appears to result at 440° C., using a time of contact of 7 seconds, giving a product having $n_D^{20}=1.478$ and $d_4^{20}=0.836$. Fractional distillation at 20 mm. shows the product obtained under these conditions to contain 90 percent of isomeric terpenes, 3 percent polymer, and 7 percent unchanged allo-ocimene. The isomeric terpenes consist chiefly of the monocycle α- and β-pyronenes in the proportion of approximately 1 to 2, respectively, having the following structural formulae, respectively:

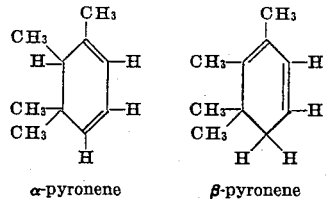

α-pyronene     β-pyronene

These pyronenes are tetramethylated cyclic hydrocarbons possessing conjugated double bonds, and the carbon skeleton corresponds to the ionone type perfumes and to certain vitamins, especially Vitamin A. These compounds, therefore, are valuable as intermediates in the synthesis of perfumes and vitamins. Furthermore, the conjugated double bond permits formation of the Diels-Alder type condensation products with, for example, maleic anhydride, acrolein, acrylonitrile, crotonic aldehyde, P-benzoquinone, α-naphthoquinone, and other dienophiles, in the production of synthetic resins, plastics, esters, and so forth.

Having thus described my invention, I claim:

1. The process comprising isomerizing allo-ocimene by heating its vapor at a temperature in the range of 300° to 500° C. for 60 to 0.1 seconds.

2. The process comprising heating the vapor of allo-ocimene at a temperature in the range of 300° to 500° C. for 60 to 0.1 seconds, whereby isomeric and polymeric terpenes are formed, and thence separating the polymeric and isomeric terpenes from each other.

3. The process comprising heating the vapor of allo-ocimene at a temperature in the range of 300° to 500° C. for 60 to 0.1 seconds, whereby a mixture of isomeric and polymeric terpenes is formed, and thence separating and recovering the isomeric terpenes from the reaction mixture.

4. The method comprising heating the vapor of allo-ocimene at a temperature of about 440° C. for about 7 seconds, whereby isomeric terpenes are formed, and thence separating the isomeric terpenes from the reaction mass.

LEO A. GOLDBLATT.

REFERENCES CITED

The following references are of record in the file of this patent:

UNITED STATES PATENTS

| Number | Name | Date |
|---|---|---|
| 2,341,948 | Rummelsburg | Feb. 14, 1944 |

OTHER REFERENCES

Goldblatt et al., J. A. C. S., 66, pages 655–6 (1944).

Arbusow, Berichte, vol. 67, pages 563–9 (1934).